United States Patent

Krisst

[11] 4,035,646
[45] July 12, 1977

[54] FLOW MONITORING SYSTEM

[75] Inventor: Raymond John Krisst, West Hartford, Conn.

[73] Assignee: Combustion Engineering, Inc., Windsor, Conn.

[21] Appl. No.: 604,755

[22] Filed: Aug. 14, 1975

[51] Int. Cl.$^2$ .................................... G01F 1/00
[52] U.S. Cl. ............................................ 250/356
[58] Field of Search .......... 250/258, 259, 260, 356

[56] References Cited
U.S. PATENT DOCUMENTS

| | | | |
|---|---|---|---|
| 3,255,347 | 6/1966 | Cobb et al. | 250/260 |
| 3,818,231 | 6/1974 | Gopal et al. | 250/356 |

*Primary Examiner*—Davis L. Willis
*Attorney, Agent, or Firm*—Stephen L. Borst; Richard H. Berneike

[57] ABSTRACT

A flow monitoring system which utilizes the decay of a measurable parameter of the flowing fluid by measuring the magnitude of the parameter at two spaced points along the flow of the fluid. Accurate measurements are enabled by the elimination of detector identity and calibration problems by repeatedly translating one detector between first and second positions external to the fluid conduit along the flow path of said fluid. This translation is preferably accomplished by a pendulum device with the detector positioned at the end of the pendulum.

12 Claims, 1 Drawing Figure

FLOW MONITORING SYSTEM

BACKGROUND OF THE INVENTION

This invention pertains to a system for measuring the flow rate of a nuclear reactor primary coolant. More particularly, this invention pertains to a system which utilizes the decay of Nitrogen-16 activity in the coolant for flow measuring purposes.

There are existing flow measuring systems which utilize the decay of Nitrogen-16 activity present in the coolant loop to determine the flow rate. Such existing flow monitors have employed two Nitrogen-16 detectors, spaced along the coolant pipe. The detectors respond to the Nitrogen-16 activity as the coolant traverses the pipe between the detector locations. The downstream detector reads less than the upstream detector due to the decay of the Nitrogen-16 activity as the water progresses between the detector locations. With decreasing flow, the relative difference between readings increases. The ratio of these readings is given generally by the following well-known equation:

$$V = \frac{-\lambda L}{\ln\left(\frac{A_2}{A_1}\right)}$$

where: $V$ = the velocity, $L$ = the separation distance between the two detectors 1 and 2, $\lambda$ is the decay constant of Nitrogen-16, and $A_1$ and $A_2$ are the respective activity readings at positions 1 and 2 by detectors 1 and 2 where position 1 is upstream of position 2. Such measuring systems have the disadvantage that the available distance between the Nitrogen-16 detectors is limited to a few feet on the hot leg of the coolant loop. Thus, the difference in magnitude between the two detector readings is in the order of 1 percent. Therefore, highly stable, sensitive, accurate detecting instruments have to be used and the sensivitity of the detectors 1 and 2 should be as close to being identical as possible. The greater the dissimilarity between the sensitivity of the two detectors, the greater is the error in the resultant velocity determination. Accordingly, in order to obtain a velocity determination which is accurate to within 1 or 2 percent, the counter identity must hold true to within approximately $10^{-4}$; a task very difficult to achieve over large time intervals.

Thus, it is the object of this invention to provide apparatus that will more accurately determine the flow rate of the coolant in the nuclear reactor coolant loop by eliminating the counter identity problem.

SUMMARY OF THE INVENTION

The central problem is overcome by using a single counter and translating the single counter back and forth by a mechanical device between first and second positions external to the fluid conduit along the hot or cold leg of the nuclear reactor primary coolant loop. The mechanical translation may be accomplished by a simple shuttle or preferably by a pendulum device. which swings the single counter back and forth between the first and second positions along the pipe. Means are provided at one or both ends for imparting energy to the system to insure that the pendulum successfully swings repeatedly to the same positions without decay in amplitude of the swing. Means may also be provided at each end to momentarily trap the detector to allow the detector to make a count of desired duration. Electronic means are also provided for repeatedly taking uniform counts over identical time periods and at the identical positions.

DESCRIPTION OF THE DRAWINGS

With these and further features, the advantages of the invention become evident in the description of the following embodiments shown in the drawings attached, wherein.

DESCRIPTION OF THE PREFERRED EMBODIMENT

Figure 1:
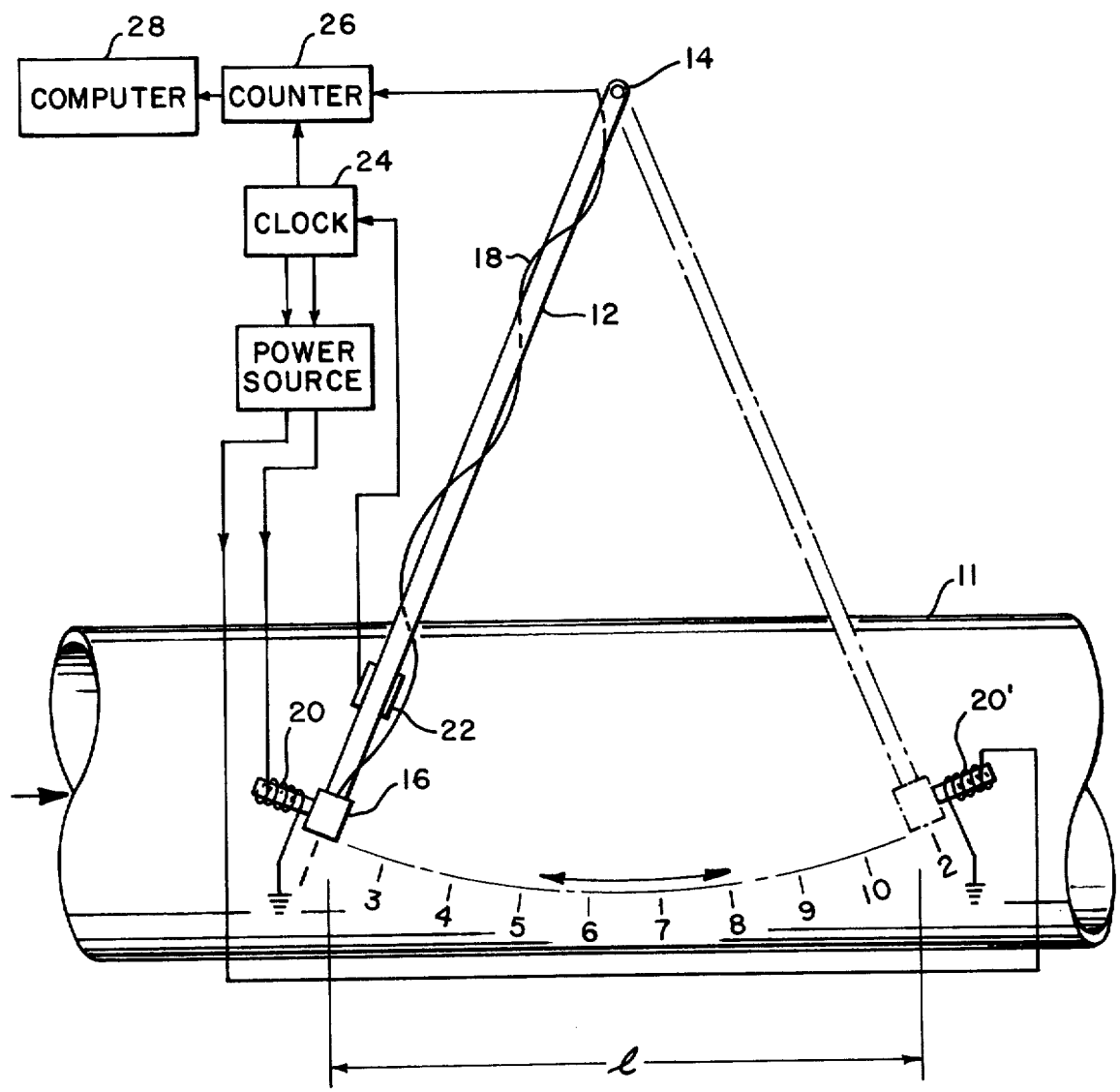
FIG. 1 is a diagrammatical representation of the preferred embodiment of the invention.

FIG. 1 shows a pipe or conduit 11 which carries within it a radioactive fluid. This pipe may be a section of the primary coolant system of a lightwater nuclear reactor or it may be any conduit carrying a radioactive fluid. As such, the pipe 11 defines a fluid flow path for the radioactive fluid. A first monitoring position is located at a first predetermined position on the outside of the pipe and a second monitoring position is located at a second position either upstream or downstream from the first position. In FIG. 1, the first position is designated by the numeral 1 and he second position could be designated by any of the other numerals 2 through 10, although the preferred second position is designated by the numeral 2. In order to remove the problem of radiation detector identity, the present invention proposes a means for repetitiously moving a radiation detector 16 from the first position along the flow path of the fluid to the second position along the flow path of the fluid and subsequently returning the radiation detector to the firest position. Whereas, the means for repetitiously moving the detector back and forth between the first and second positions along the fluid flow path may be any mechanical device such as a pneumatic shuttle, a rail-mounted shuttle or an oscillating spring wand, the preferred embodiment disclosed in FIG. 1 is a swinging pendulum 12 with pivot point 14 carrying detector 16 at its extreme swinging end. Electrical leads 18 may be wound up the arm of the pendulum 12 for the purpose of connecting the moving detector 16 to the appropriate electronic circuitry. The pendulum device of the preferred embodiment has the advantage that the motion of a pendulum is well understood and precisely reproducible so that the period of the pendulum, or the time that it takes for the pendulum to swing from the first position to the second position, is known to a high degree of precision. In addition, the amplitude of the pendulum's swing or the distance between the first and second positions can be determined with a corresponding degree of precision.

In the preferred embodiment of the invention means 20 and 20' are provided for temporarily restraining the pendulum and the detector 16 in the first and second positions respectively. Devices 20 and 20'may consist of a solenoid operated latch device or of a simple electromagnet which is temporarily energized to temporarily restrain the pendulum. By temporarily restraining the detector 16 in positions 1 and 2, two readings, $A_1$ and $A_2$, indicative of the counting rates at positions 1 and 2 may be obtained for use in the equation previously discussed. Means 20 and 20' may also act as a means for repetitiously imparting energy to the pendulum to prevent the long term decay of the amplitude of the swing of the pendulum. Accordingly, if means 20 and 20' are electromagnets then the electromagnet at each end is energized shortly in advance of the time when detector 16 reaches the counting position 1 (or 2). The magnetic field of the device 20 lifts the pendulum and the detector 16 through the last incremental portion of the swing of the pendulum thereby adding energy to the system. Inasmuch as this energy addition is made at each end of the swing of the pendulum 12 and on each and every cycle, sufficient energy is continually added into the system to prevent the decay of the amplitude of the swing of the pendulum. This insures that the detector 16 will always reach the restraining devices 20 and 20' at the extreme ends of its swings.

Devices 20 and 20' are activated by a timing device or clock 24. In order to keep synchronization between the pendulum 12, the clock 24, and the restraining devices 20 and 20' a "trigger" or field coil 22 is provided to generate a timing pulse. In this manner, the timing means 24 is continually reset to begin a new timing cycle. One possible configuration would be to place the field coil 22 in a positon which is slightly inside of the pendulum's maximum amplitude which would then be just short of monitoring position 1. With such a configuration, a pulse is generated by the field coil 22 a very short period of time before the pendulum reaches its maximum position of swing. The timing pulse can then be used to activate the clock which immediately sends out an activation signal to restraining means 20. Accordingly, the magnetic field of means 20 is turned on and the pendulum is lifted the final fractional portion of its swing. Restraining means 20 remains energized for an appropriate counting period at which time the clock 24 causes it to de-energize At this time, the pendulum is dropped and it begins to swing to the other monitoring position 2. Since the swinging characteristics of a pendulum are identically reproducible, the timing means 24 can be set to provide an energizing signal to restraining means 20' just prior to the time when the pendulum 12 reaches its maximum approach to monitoring position 2. Upon energization of restraining means 20', the pendulum is again lifted the final fraction of its swing to monitoring position 2 where it is restrained for a period of time equivalent to that which it was restrained in monitoring positon 1. A signal from the timing means 24 then de-energizes the restraining device 20' and the pendulum begins to swing back to the first monitoring position. Just prior to its reaching the first monitoring position, the pendulum 12 crosses the field coil 22 and a new timing pulse is generated to reset the clock 24 and the cycle is repeated.

Also provided is a counter 26 and a computer 28. Counter 26 receives and counts the signals generated by the detector 16. Counter 26 is also responsive to signals from the timing means 24. In this manner, the counter 26 accumulates counts from detector 16 only during those periods of time when the detector 16 is being held at its monitoring positions 1 and 2. The accumulated accounts $A_1$ and $A_2$ are then delivered to the computer 28 for the appropriate computation of the velocity of the fluid. Computer 28 may be either a state of the art analog piece of equipment or an appropriately programmed digital computer.

In an improved embodiment of the present invention, the counter 26 can not only accumulate counts at the end monitoring positions 1 and 2, but can also continuously obtain rates from a multiplicity of positions along the path of the swing of the detector 16 on the pendulum 12. By doing so, the counter 26 can establish counting rates not only for the end monitoring positions, but also for a multiplicity of intermediate positions 3 through 10. With this information, the computer 28 can apply the equation:

$$V = \frac{-\lambda L}{\ln \frac{A_x}{A_y}}$$

where $A_y$ is the counting rate corresponding to a position upstream from the position at which a counting rate of $A_x$ was determined. Accordingly, the computer 28 can make a multiplicity of determinations of the velocity V from the multiple counting rates corresonding to the positions 1 through 10. As is well-known in the discipline of statistical data analysis, this multiplicity of velocity determinations significantly improves the statistics which may be applied to the velocity determination and thereby significantly improves the response time of the aparatus.

What is claimed is:

1. An apparatus for monitoring the flow of a radioactive fluid along a fluid flow path within a conduit, said apparatus comprising:
   a. a radiation detector eternal to the conduit;
   b. means operativey connected to said detector for repetitiously moving said radiation detector from a first position along the flow path of said fluid to a second position along the flow path of said fluid and returning said radiation detector to said first position;
   c. means connected to said radiation detector for generating first and second signals proportional to the intensity of the radiation reaching said radiation detector at said first and second positions; and
   d. means connected to said signal generating means for computing the rate of flow of said radioactive fluid from the magnitude of said first and second signals.

2. The apparatus as recited in claim 1 wherein said means connected to said radiation detector for generating a signal proportional to the intensity of the radiation reaching said radiation detector further includes a timing means.

3. The apparatus as recited in claim 2 wherein said radioactive fluid is the coolant of a nuclear reactor.

4. An apparatus for monitoring the flow of a radioactive fluid along a fluid flow path, said apparatus comprising:
   a. a radiation detector;
   b. a pendulum operatively connected to said detector for repetitiously moving said radiaton detector from a first position along the flow of said fluid to a second position along the flow path of said fluid and returning said radiation detector to said first position; and
   c. means connected to said radiation detector for generating a signal proportional to the intensity of the radiation reaching said radiation detector.

5. The apparatus as recited in claim 4 further including means for temporarily restraining said pendulum at said first and second positions.

6. The apparatus of claim 4 further comprising means connected to said signal generating means for computing the rate of flow of said radioactive fluid.

7. The apparatus as recited in claim 6 further including means for temporarily restraining said pendulum at said first and second positions.

8. The apparatus as recited in claim 6 wherein said radioactive fluid is the coolant of a nuclear reactor.

9. The apparatus as recited in claim 6 wherein said means for repetitiously moving said radiation detector from a first position along the flow path of said fluid to a second position along the flow path of said fluid further including means for repetitiously imparting energy to said pendulum to prevent the decay of the amplitude of the swing of said pendulum.

10. The apparatus as recited in claim 6 further including means operatively connected to said timing means for synchronizing said pendulum and said means for generating a signal proportional to the intensity of the radiation reaching said radiation detector.

11. The apparatus as recited in claim 10 wherein said synchronizing means includes means operatively connected to said timing means for indicating when said pendulum reaches a predetermined position.

12. The aparatus as recited in claim 10 wherein said means for generating a signal proportional to the intensity of radiation reaching said detector includes means for generating a multiplicity of signals proportional to the intensity of radiation reaching said detector at a multiplicity of positons along the arc of the swing of said pendulum.

* * * * *